United States Patent
Yacoub

(10) Patent No.: US 7,885,391 B2
(45) Date of Patent: Feb. 8, 2011

(54) SYSTEM AND METHOD FOR CALL CENTER DIALOG MANAGEMENT

(75) Inventor: Sherif Yacoub, Sant Cugat del Valles (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 2155 days.

(21) Appl. No.: 10/699,264

(22) Filed: Oct. 30, 2003

(65) Prior Publication Data

US 2005/0094798 A1 May 5, 2005

(51) Int. Cl.
*H04M 1/64* (2006.01)
*G10L 15/04* (2006.01)
*G10L 11/00* (2006.01)

(52) U.S. Cl. ............. 379/88.25; 704/270; 704/251
(58) Field of Classification Search ............ 379/88.04, 379/88.18, 88.22
See application file for complete search history.

(56) References Cited

U.S. PATENT DOCUMENTS

| | | | | |
|---|---|---|---|---|
| 5,842,167 | A * | 11/1998 | Miyatake et al. | 704/260 |
| 5,845,047 | A * | 12/1998 | Fukada et al. | 704/268 |
| 6,748,361 | B1 * | 6/2004 | Comerford et al. | 704/275 |
| 6,961,410 | B1 * | 11/2005 | Castagna | 379/88.23 |
| 7,024,363 | B1 * | 4/2006 | Comerford et al. | 704/270 |
| 7,107,243 | B1 * | 9/2006 | McDonald et al. | 705/40 |
| 7,627,476 | B2 * | 12/2009 | Nanavati et al. | 704/270.1 |
| 7,672,845 | B2 * | 3/2010 | Beranek et al. | 704/251 |
| 2002/0184002 | A1 | 12/2002 | Galli | |
| 2004/0193421 | A1 * | 9/2004 | Blass | 704/258 |
| 2005/0193092 | A1 * | 9/2005 | Habermas | 709/219 |
| 2006/0116876 | A1 * | 6/2006 | Marcus | 704/231 |

OTHER PUBLICATIONS

Michele Covell et al—"Mach1: Nonuniform Time-Scale Modification of Speech"—Proceedings of the IEEE International Conference on Acoustics, Speech and Signal Processing May 1998—pp. 349-352.

Salim Roucos et al—"High Quality Time-Scale Modification for Speech"—Proceedings of the IEEE International Conference on Acoustics, Speech and Signal Processing—1985—pp. 493-496.

* cited by examiner

*Primary Examiner*—Joseph T Phan
(74) *Attorney, Agent, or Firm*—Lloyd E Dakin

(57) ABSTRACT

A system and method for call center dialog management is disclosed. The method discloses: presenting a contact with a first call center dialog segment having a current call center dialog property; receiving from the contact a contact dialog segment; identifying a dialog property keyword within the contact dialog segment; replacing the current call center dialog property with a new call center dialog property in response to the dialog property keyword; and presenting a second call center dialog segment having the new call center dialog property to the contact. The system of the present invention, discloses means for implementing the method.

20 Claims, 4 Drawing Sheets

US 7,885,391 B2

SYSTEM AND METHOD FOR CALL CENTER DIALOG MANAGEMENT

BACKGROUND OF THE INVENTION

1. Field of the Invention

The present invention relates generally to systems and methods for call management, and more particularly to varying a call center dialog property.

2. Discussion of Background Art

Call centers are increasingly used to manage calls to and from a variety of entities and in a variety of applications. Some entities (i.e. contacts) include, existing customers, potential customers, suppliers, and vendors. Some call center applications include, providing movie theatre listings and driving directions, automated banking, and product marketing.

Such systems often use Interactive Voice Response (IVR) software as a first step in processing an incoming call before connecting the contact with a human operator. The IVR software tends to improve the call center's efficiency and reduce a number of human operators required to handle the contacts.

In a typical dialog between the IVR software and the contact, the IVR software presents the contact with either information or a question. The contact listens to the information or question, and then responds in some way, either by requesting more information or answering the question. The IVR system's portion of the dialog typically consists of either prerecorded messages or synthesized text generated by a Text-To-Speech (TTS) algorithm.

However, while the actual information presented to the contact can greatly vary depending upon the outcome of such questions and answers, how that information is presented to the contact tends to have a fixed set of properties which are set when the IVR system's software is first compiled. Such rigid properties often present the IVR system's dialog in a wooden, awkward, inefficient, and hard to understand way, so much so that contacts often become confused and or frustrated with the dialog, resulting in either a lost sale, or premature connection to a human operator.

So while an IVR system designer might be able to modify how the IVR system presents the dialog before an IVR system's source code is compiled, present call center IVR systems do not give contacts control in how the IVR system's dialogs are presented during execution the IVR system's object code.

In response to the concerns discussed above, what is needed is a system and method for call management that overcomes the problems of the prior art.

SUMMARY OF THE INVENTION

The present invention is a system and method for call center dialog management. The method of the present invention includes: presenting a contact with a first call center dialog segment having a current call center dialog property; receiving from the contact a contact dialog segment; identifying a dialog property keyword within the contact dialog segment; replacing the current call center dialog property with a new call center dialog property in response to the dialog property keyword; and presenting a second call center dialog segment having the new call center dialog property to the contact. The system of the present invention, includes all means for implementing the method.

These and other aspects of the invention will be recognized by those skilled in the art upon review of the detailed description, drawings, and claims set forth below.

DETAILED DESCRIPTION OF THE PREFERRED EMBODIMENT

The present invention enables the properties of a dialog between a contact and a call center to be varied in real-time as the call center and contact interact. For example, a dialog's speed property can be adjusted based on the call center's analysis of how the dialog is proceeding, or manually adjusted by a party in contact with the call center, based on that contact's needs and preferences. Such flexibility greatly improves a call center's responsiveness to contacts. For instance, contacts more accustomed toward listening slowly, or contacts not fluent in the language of the dialog can reduce the dialog's speed, while those contacts able to listen more quickly and who are perhaps more familiar with the dialog's subject matter can increase the dialog's speed.

Figure 1:
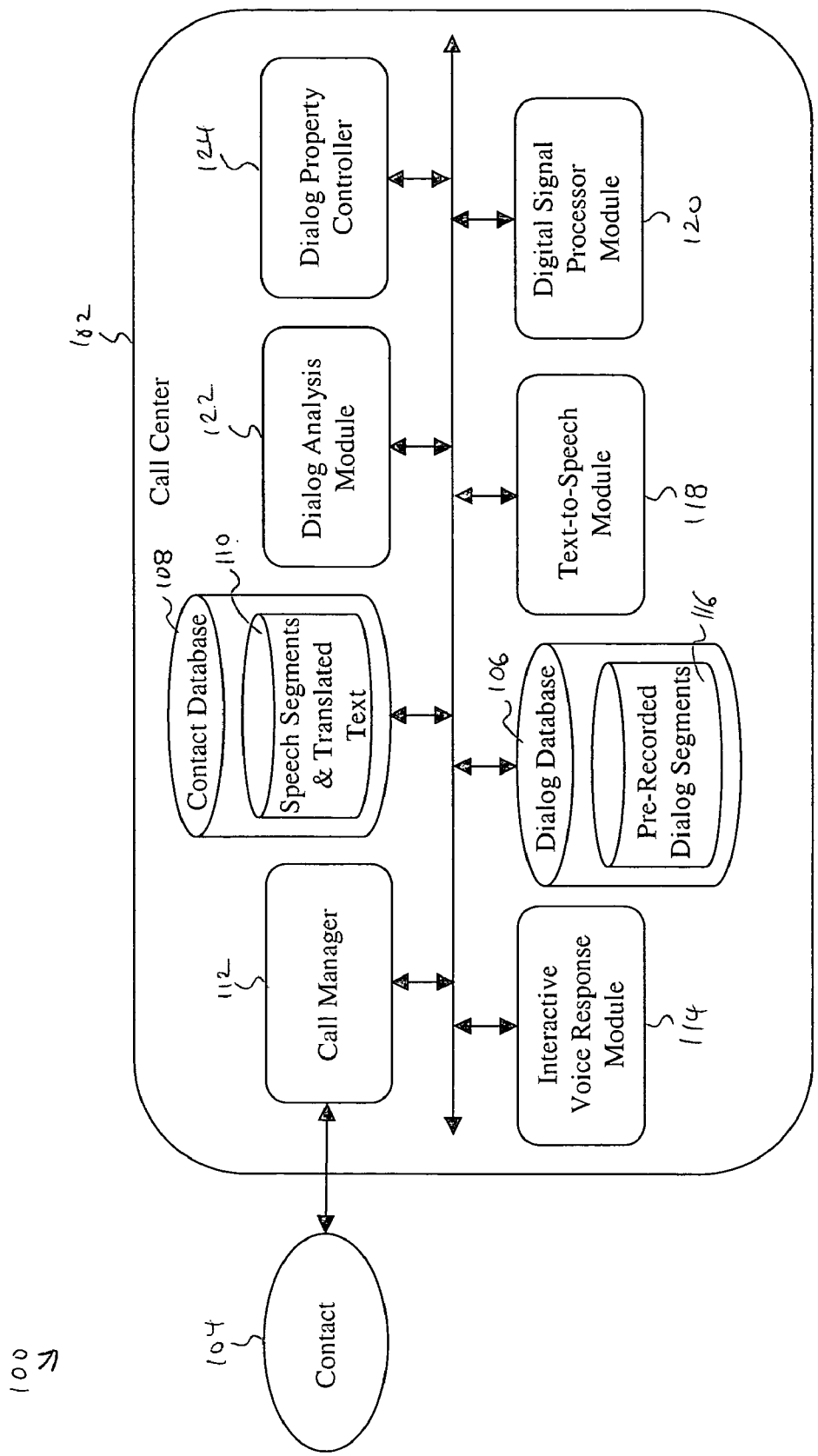
FIG. 1 is a dataflow diagram of one embodiment of a system for call center dialog management.

FIG. 1 is a dataflow diagram of one embodiment of a system 100 for call center dialog management. A call center 102 enters into a dialog with a contact 104. The dialog may have been initiated by the contact 104 who called the call center 102 (i.e. an incoming call), or by the call center 102 which called the contact 104 (i.e. an outgoing call). Typical call centers include both computer systems and human operators which interact with various contacts. Contacts are most often human, but in some instances can include other non-human entities, such as a computer system.

The call center 102 presents a first call center dialog segment having a current set of call center dialog properties to the contact 104. The call center 102 then receives a contact dialog segment generated by the contact 104.

The subject matter of the call center's 102 dialog segments is dependent upon information stored in both a dialog database 106 and a contact database 108. The dialog database 106 contains dialog segments (i.e. messages and prompts) having varying levels of specificity. Some of the dialog database's 106 messages may be very generic, such as "Hello, you've reached . . . ", and are intended to be presented to many if not most contacts. Other messages in the dialog database 106 may be very specifically tailored toward a particular type of information being exchanged between the call center 102 and the contact 104, such as "Your portfolio currently includes . . . ".

The contact database 106 associates each contact with a specific set of contact attributes. Such attributes include: the contact's phone number and address, a relationship status (such as whether the contact is a customer and etc.), a historical record of the contact's 104 past and present dialogs with the call center 102, a set of speech segments (i.e. recorded vocal utterances) and translated text 110, and many other attributes known to those skilled in the art. These attributes may be populated and supplemented from a variety of sources, including the call center's 102 own dialog questions, publicly available phone directories, the internet, and customer warranty cards.

The subject matter of the dialog depends upon the call center's 102 purpose and the contact's 104 attributes. Thus, if the call center's purpose was to provide contacts with financial information, then the contact 104 will be presented with a dialog that first asks a series of generic security verification questions followed by a more specific set of portfolio questions and prompts retrieved from the dialog database 106. The contact 104 would then be presented with the contact's 104 own portfolio information retrieved from the contact database 108.

A call manager 112 within the call center 102 activates an Interactive Voice Response (IVR) module 114. The IVR module 114 translates the contact's 104 vocal utterances and telephone tones into a form which the call center can understand using either Natural Language Processing (NLP) algorithms, Automated Speech Recognition (ASR) algorithms, or Voice Extensible Markup Language (Voice-XML) interpreters. The IVR module 114 also translates the call center's dialog segments, in accordance with the current call center dialog properties, into an audible form which the contact 104 can understand. The IVR module 114 draws upon either pre-recorded dialog segments 116 stored in the dialog database 106, a Text-To-Speech (TTS) module 118, or a digital signal processor module 120 in order to help present the call center's dialog to the contact 104. The call manager 112 stores a historical record of both the call center 102 and contact 104 dialog segments in the contact database 108.

Operating in parallel with the dialog between the contact 104 and the call center 102 is a dialog analysis module 122. The dialog analysis module 122 identifies a set of dialog property keywords from the various contact dialog segments within the dialog.

Dialog property keywords related to the dialog's speed include, "faster" and "slower". For example the contact 104 could say either "Speak faster", "Could you please speak faster", "Faster please", "Slow down", "Could you please speak slowly", or "Slower please" in order to request that the speed of the call center's 102 portion of the dialog be either increased or decreased respectively. Thus each contact with the call center 102 can individually control the speed of their own dialog with the call center 102. Such explicit requests by the contact 104 for adjusting the speed of the dialog are preferably understood by the call center 102 using the Voice-XML interpreter within the IVR module 114. So that the contact 104 does not accidentally invoke one of the keywords during the dialog, the actual keywords searched for by the dialog analysis module 122 are selected to minimize any direct or phonetically equivalent conflict between the keywords and the contact's 104 normal dialog with the call center 102. For example, if the contact's 104 normal dialog with the call center 102 is expected to include the word "faster", then "faster" would not be selected as a keyword.

The dialog analysis module 122 replaces the current call center dialog properties with a new set of call center dialog properties, in response to the identified dialog property keywords. For instance, in the example above where the dialog property keywords relate to a speed at which the call center's 102 dialog segments are presented to the contact 104, the first call center dialog property differs from the second call center dialog property by the speed with which the call center's 102 dialog segments are to be presented to the contact 104. The speed may either be increased or decreased as directed by the keyword.

In parallel with the functionality above, the dialog analysis module 122 also executes an automated dialog property management routine which can modify the call center's dialog properties as well, as is now discussed. The dialog analysis module 122 retrieves the contact's 104 attributes, speech segments, and translated text from the contact database 108. The data retrieved includes the current dialog between the contact 104 and the call center 102. The dialog analysis module 122 generates a set of dialog metrics, representative of the current dialog between the contact 104 and the call center 102, from the information retrieved.

The set of dialog metrics include: a contact dialog interpretation error rate, indicative of how many times the contact 104 was asked to repeat the contact's 104 answer to a call center 102 question; a grammar error rate, indicative of how poor the contact's 104 grammar is; and a contact help request rate, indicative of how often the contact 102 requests access to the call center's 102 help directory. These metrics are specific instances of a general dialog quality metric. Those skilled in the art will recognize that other heuristics and metrics for determining how "well" the dialog between the contact 104 and the call center 102 is proceeding and how "well" the contact 104 is "handling" the dialog.

The dialog analysis module 122 compares the set of dialog metrics against a first set of dialog metric thresholds. If the generated dialog metrics varies from the first set of thresholds by a predetermined amount, the dialog analysis module 122 replaces the current call center dialog properties with a new set of call center dialog properties. Automatic modification of the call center's dialog properties is intended to bring the dialog metrics back within a permitted variation from the first set of thresholds.

For example, if the contact dialog interpretation and grammar error rates exceed a first set of error rate thresholds, indicating that the contact 104 is having difficulty with the dialog, the dialog analysis module 122 can replace the call center's current dialog speed with a new slower dialog speed. However, if the contact dialog interpretation and grammar error rates fall below the first set of thresholds, indicating that the contact 104 is actually doing quite well with the dialog, then the dialog analysis module 122 can replace the call center's current dialog speed with a new faster dialog speed, enabling the contact 104 to more quickly dialog with the call center 102.

Since the dialog analysis module 122 contains two routines for modifying the call center's 102 dialog properties (e.g. the dialog property keyword routine and the automated dialog property management routine), the dialog analysis module 122 preferably uses the automated dialog property management routine only if the contact 104 has not invoked any of the keywords.

The dialog analysis module 122 transmits the new call center dialog properties to a dialog property controller 124. The dialog property controller 124 replaces the current set of call center dialog properties with the new set of dialog properties, using one of several different techniques, three of which are now described.

The first technique relies on the pre-recorded dialog segments 116 stored in the dialog database 106. The pre-recorded dialog segments 116 include a set of digitized pre-recorded call center dialog segments. These segments are pre-recorded by a person speaking the dialog segment, and then stored in the dialog database 106. While various sub-sets of the dialog segments 116 contain the same substantive information, they are recorded in a different form (i.e. with different dialog properties). For instance, the dialog segment "Hello . . . " can be recorded in several different languages, while still substantively being "a greeting". Similarly, the dialog segment "Hello . . . " can be recorded at different speeds, one at a slow pace, one at a moderate pace, and one at a fast pace. Thus, the dialog property controller 124 replaces a first pre-recorded call center dialog segment having the current set of properties with a second pre-recorded dialog segment having the new set of properties.

The second technique varies parameters within the text-to-speech module 118. The text-to-speech module 118 translates written text within the dialog database 106 into audible sounds corresponding to the text which the contact 104 can understand. The text-to-speech module 118 includes a synthesizer whose synthesized speech parameters, such as pitch, duration, rate, etc., can be automatically varied. For example, the speed of the dialog can be varied by adjusting the text-to-speech module's 118 rate parameter. Dialog speed can be varied in a Voice-XML implementation of this technique, by controlling a <prosody> tag inside the <dialog> tag. The <prosody> tag controls a rate by which a dialog is played. When the dialog's properties can be varied using the text-to-speech module 118, the dialog property controller 124 can more finely tune the properties than by varying the pre-recorded dialog segments of the first technique. Then the dialog property controller 124 adjusts a text-to-speech synthesizer so that subsequent call center dialog segments are generated using the new set of properties instead of the current set of call center dialog properties.

The third technique uses the digital signal processing module 120 to adjust some of the dialog's properties. For example, dialog speed is varied by using the digital signal processing module 120 to perform signal processing time-scale modifications which can either speed-up or slow-down the dialog's speed. Several digital signal processing filters are well known for this purpose. Then the dialog property controller 124 adjusts a digital signal processor parameter so that subsequent call center dialog segments are generated using the new set of properties instead of the current set of call center dialog properties. Those skilled in the art will recognize that other techniques for varying dialog properties are also possible.

The IVR module 114 presents subsequent call center dialog segments to the contact 104 using the new call center dialog properties. Thus modifications to the call center dialog properties are effected in a seamless way, while the dialog between the contact 104 and the call center 102 occurs, and there is no need to either halt or interrupt execution of the dialog or the call center's 102 software.

Figure 2:
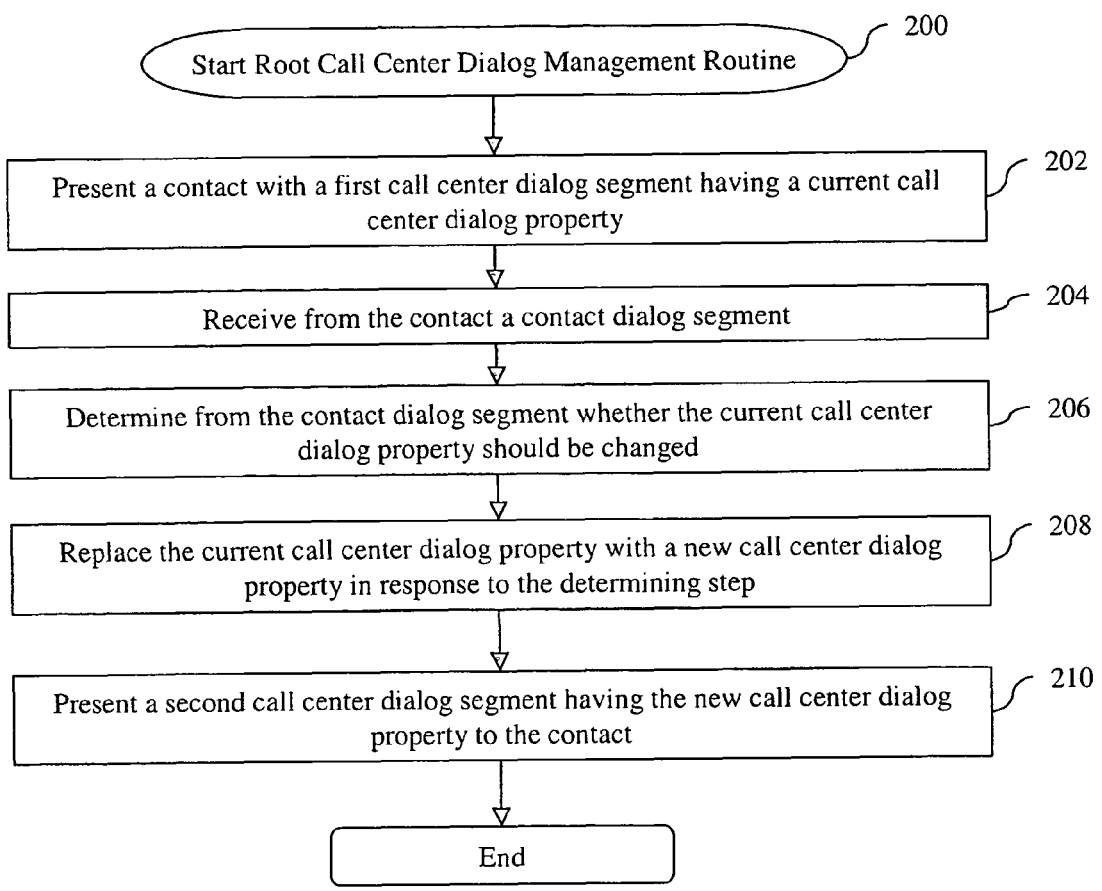
FIG. 2 is a flowchart of one embodiment of a root method for call center dialog management.

FIG. 2 is a flowchart of one embodiment of a root method 200 for call center dialog management. In step 202 of the root method 200 the contact 104 is presented with a first call center dialog segment having a current call center dialog property. In step 204, a contact dialog segment is received from the contact. In step 206, determining from the contact dialog segment whether the current call center dialog property should be changed. In step 208, the current call center dialog property is replaced with a new call center dialog property in response to the determining step. Then in step 210, a second call center dialog segment having the new call center dialog property is presented to the contact. The root method 200 is discussed in further detail with respect to FIG. 3.

Figure 3A:
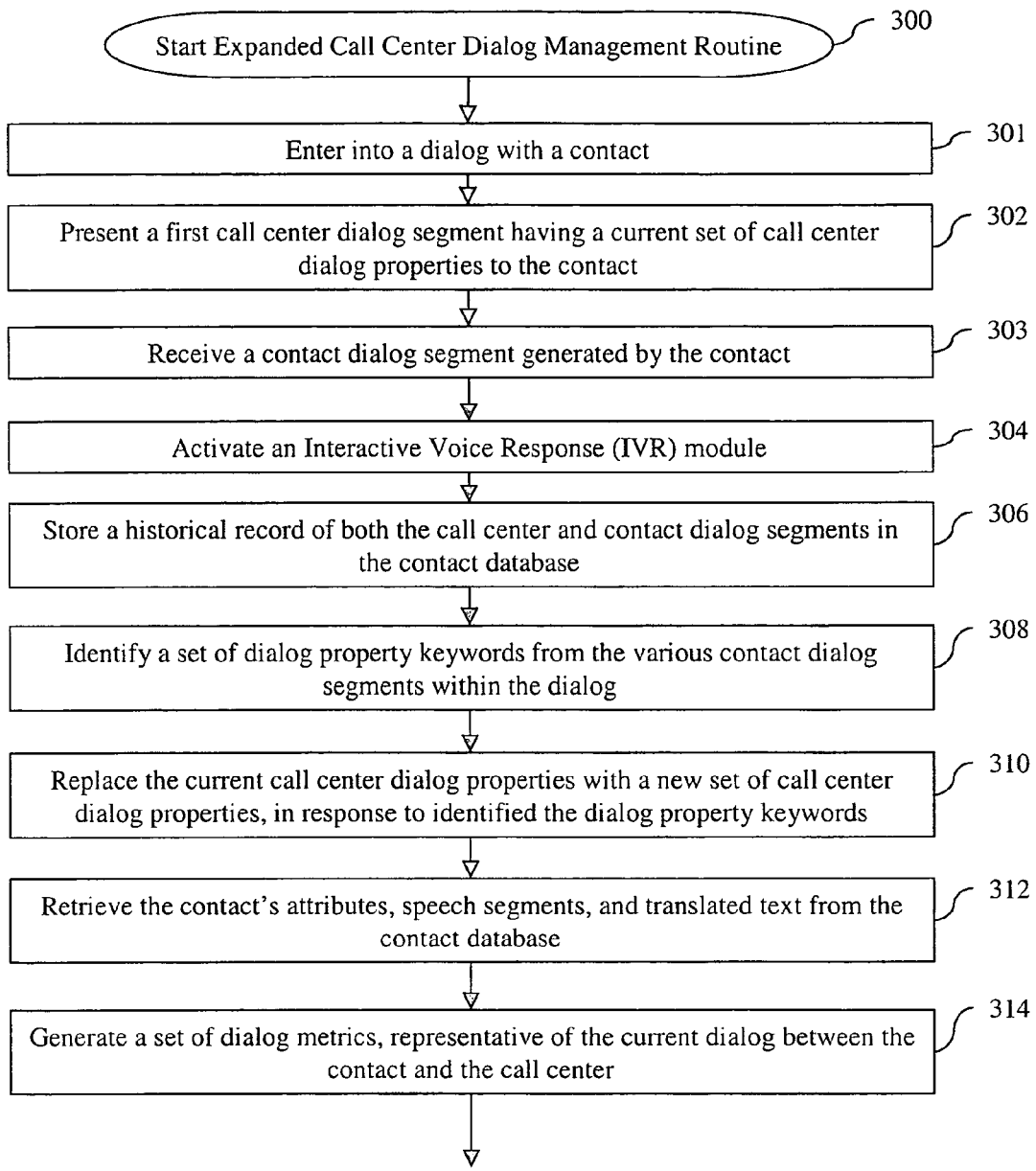
FIG. 3 is a flowchart of one expanded embodiment of the root method for call center dialog management.
Figure 3B:
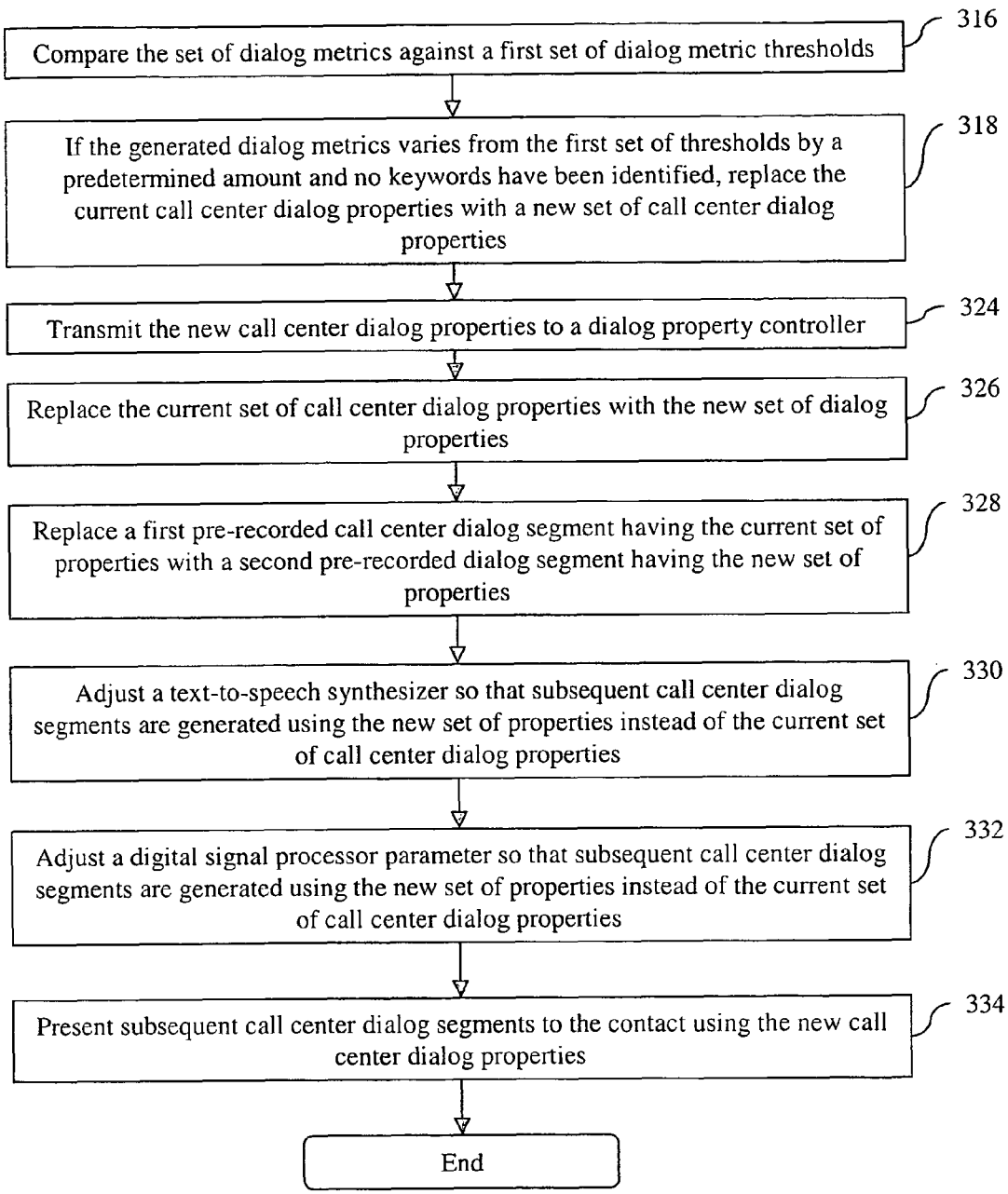

FIG. 3 is a flowchart of one expanded embodiment of the root method 300 for call center dialog management. In step 301, a call center 102 enters into a dialog with a contact 104. The dialog may have been initiated by the contact 104 who called the call center 102 (i.e. an incoming call), or by the call center 102 which called the contact 104 (i.e. an outgoing call).

In step 302, the call center 102 presents a first call center dialog segment having a current set of call center dialog properties to the contact 104. In step 303, the call center 102 receives a contact dialog segment generated by the contact 104.

In step 304, a call manager 112 within the call center 102 activates an Interactive Voice Response (IVR) module 114. In step 306, the call manager 112 stores a historical record of both the call center 102 and contact 104 dialog segments in the contact database 108.

Operating in parallel with the dialog between the contact 104 and the call center 102 is a dialog analysis module 122. In step 308, the dialog analysis module 122 identifies a set of dialog property keywords from the various contact dialog segments within the dialog.

In step 310, the dialog analysis module 122 replaces the current call center dialog properties with a new set of call center dialog properties, in response to identified the dialog property keywords. For instance, in the example above where the dialog property keywords relate to a speed at which the call center's 102 dialog segments are presented to the contact 104, the first call center dialog property differs from the second call center dialog property by the speed with which the call center's 102 dialog segments are to be presented to the contact 104. The speed may either be increased or decreased as directed by the keyword.

In parallel with steps 308 and 310 above, the dialog analysis module 122 also executes an automated dialog property management routine which can modify the call center's dialog properties as well, as is now discussed. In step 312, the dialog analysis module 122 retrieves the contact's 104 attributes, speech segments, and translated text from the contact database 108. In step 314, the dialog analysis module 122 generates a set of dialog metrics, representative of the current dialog between the contact 104 and the call center 102, from the information retrieved in step 312.

In step 316, the dialog analysis module 122 compares the set of dialog metrics against a first set of dialog metric thresholds.

In step 318, if the generated dialog metrics varies from the first set of thresholds by a predetermined amount and no keywords have been identified, the dialog analysis module 122 replaces the current call center dialog properties with a new set of call center dialog properties.

In step 324, the dialog analysis module 122 transmits the new call center dialog properties to a dialog property controller 124. In step 326, the dialog property controller 124 replaces the current set of call center dialog properties with the new set of dialog properties, using one of several different techniques, three of which are now described. Using the first technique, in step 328, the dialog property controller 124 replaces a first pre-recorded call center dialog segment having the current set of properties with a second pre-recorded dialog segment having the new set of properties. Using the second technique, in step 330, the dialog property controller 124 adjusts a text-to-speech synthesizer so that subsequent call center dialog segments are generated using the new set of properties instead of the current set of call center dialog properties. Using the third technique, in step 332, the dialog property controller 124 adjusts a digital signal processor parameter so that subsequent call center dialog segments are generated using the new set of properties instead of the current set of call center dialog properties. Those skilled in the art will recognize that other techniques for varying dialog properties are also possible.

Then in step 334, the IVR module 114 presents subsequent call center dialog segments to the contact 104 using the new call center dialog properties.

Note, while the present invention has been discussed primarily with respect to a dialog speed property, those skilled in the art will recognize that other dialog properties, such as dialog language choice, how concise the call center's dialog segments are (i.e. a contact expertise level where there can be novice, intermediate, and expert level segments, whereby the expert level segments are presented to knowledgeable contacts, while the novice level segments are presented to less skilled contacts), how detailed the help messages presented to the contact are (i.e. a contact help level), and many other properties can be dynamically varied as the system 100 executes as well.

While one or more embodiments of the present invention have been described, those skilled in the art will recognize that various modifications may be made. Variations upon and modifications to these embodiments are provided by the present invention, which is limited only by the following claims.

What is claimed is:

1. A method for call center dialog management, comprising:
    presenting a contact with a first call center dialog segment having a current call center dialog property;
    receiving from the contact a contact dialog segment;
    identifying a dialog property keyword within the contact dialog segment, the dialog property keyword including a request for a modification of the current call center dialog property;
    replacing the current call center dialog property with a new call center dialog property in accordance with the request;
    presenting a second call center dialog segment having the new call center dialog property to the contact;
    generating a set of dialog metrics from the contact dialog segment; and
    comparing the set of dialog metrics against a set of dialog metric thresholds; and
    wherein replacing includes, replacing the current call center dialog property with a second new call center dialog property, if no dialog property keyword is identified and the generated dialog metrics vary from the first set of thresholds by a first predetermined amount.

2. The method of claim 1:
    wherein the dialog property keyword indicates a dialog speed; and
    wherein replacing includes replacing a first dialog speed with a second dialog speed.

3. The method of claim 1:
    wherein the dialog property keyword indicates a dialog language; and
    wherein replacing includes replacing a first dialog language with a second dialogue dialog language.

4. The method of claim 1:
    wherein the dialog property keyword indicates a contact expertise level; and
    wherein replacing includes replacing a first contact expertise level with a second contact expertise level.

5. The method of claim 1:
    wherein the dialog property keyword indicates a contact help level; and
    wherein replacing includes replacing a first contact help level with a second contact help level.

6. The method of claim 1:
    wherein replacing includes replacing a first pre-recorded call center dialog segment having the current call center dialog property with a second prerecorded dialog segment having the new center dialog property.

7. The method of claim 1:
    wherein replacing includes adjusting a text-to-speech synthesizer from generating center dialog segments having the current call center dialog property toward generating center dialog segments having the new call center dialog property.

8. The method of claim 1:
    wherein replacing includes adjusting a Voice-XML prosody tag from generating center dialog segments having the current call center dialog property towards generating center dialog segments having the new call center dialog property.

9. The method of claim 1:
    wherein replacing includes adjusting a digital signal processor timescale modification.

10. A method for call center dialog management, comprising:
    presenting a contact with a first call center dialog segment having a current call center dialog property;
    receiving from the contact a contact dialog segment;
    determining whether the contact dialog segment includes a request for help associated with interpreting the first call center dialog segment;
    generating a first dialog metric based on the determination;
    generating a set of dialog metrics including the first dialog metric from the contact dialog segment;
    comparing the set of dialog metrics against a set of dialog metric thresholds;
    replacing the current call center dialog property with a new call center dialog property, if the generated dialog metrics vary from the set of thresholds by a predetermined amount; and
    presenting a second call center dialog segment having the new call center dialog property to the contact.

11. The method of claim 10 wherein generating includes:
    totaling a number of times the contact was asked to respond to the first call center dialog segment.

12. The method of claim 10 wherein generating the first dialog metric includes:
    totaling a number of times the contact requested help.

13. The method of claim 10 wherein generating includes:
    calculating how poor the contact's grammar is.

14. The method of claim 10 wherein replacing includes:
    replacing a first dialog speed with a second dialog speed.

15. The method of claim 10 wherein replacing includes:
    replacing a first dialog language with a second dialog language.

16. A method for call center dialog management, comprising:
    presenting a contact with a first call center dialog segment having a current call center dialog property;
    receiving from the contact a contact dialog segment;
    determining whether the contact dialog segment includes a dialog property keyword, the dialog property keyword including a request for a modification of the current call center dialog property;
    generating a set of dialog metrics from the contact dialog segment;
    comparing the set of dialog metrics against a set of dialog metric thresholds;
    replacing the current call center dialog property with a new call center dialog property in accordance with the request based on the determination;
    replacing the current call center dialog property with a second new call center dialog property, if no dialog property keyword is identified and the generated dialog metrics vary from the set of thresholds by a first predetermined amount; and
    presenting a second call center dialog segment having the new call center dialog property to the contact.

17. A computer-usable medium embodying computer program code for commanding a computer to effect call center dialog management, comprising:
- presenting a contact with a first call center dialog segment having a current call center dialog property;
- receiving from the contact a contact dialog segment;
- identifying a dialog property keyword within the contact dialog segment, the dialog property keyword including a request for a modification of the current call center dialog property;
- replacing the current call center dialog property with a new call center dialog property in accordance with the request;
- presenting a second call center dialog segment having the new call center dialog property to the contact;
- generating a set of dialog metrics from the contact dialog segment; and
- comparing the set of dialog metrics against a set of dialog metric thresholds; and wherein replacing includes, replacing the current call center dialog property with a second new call center dialog property, if no dialog property keyword is identified and the generated dialog metrics vary from the first set of thresholds by a first predetermined amount.

18. A computer-usable medium embodying computer program code for commanding a computer to effect call center dialog management, comprising:
- presenting a contact with a first call center dialog segment having a current call center dialog property;
- receiving from the contact a contact dialog segment;
- determining whether the contact dialog segment includes a request for help associated with interpreting the first call center dialog segment;
- generating a first dialog metric based on the determination;
- generating a set of dialog metrics including the first dialog metric from the contact dialog segment;
- comparing the set of dialog metrics against a set of dialog metric thresholds;
- replacing the current call center dialog property with a new call center dialog property, if the generated dialog metrics vary from the set of thresholds by a predetermined amount; and
- presenting a second call center dialog segment having the new call center dialog property to the contact.

19. A system for call center dialog management, comprising:
- means for presenting a contact with a first call center dialog segment having a current call center dialog property;
- means for receiving from the contact a contact dialog segment;
- means for identifying a dialog property keyword within the contact dialog segment, the dialog property keyword including a request for a modification of the current call center dialog property;
- means for replacing the current call center dialog property with a new call center dialog property in accordance with the request;
- means for presenting a second call center dialog segment having the new call center dialog property to the contact;
- means for generating a set of dialog metrics from the contact dialog segment; and
- means for comparing the set of dialog metrics against a set of dialog metric thresholds; and wherein replacing includes, replacing the current call center dialog property with a second new call center dialog property, if no dialog property keyword is identified and the generated dialog metrics vary from the first set of thresholds by a first predetermined amount.

20. A system for call center dialog management, comprising:
- means for presenting a contact with a first call center dialog segment having a current call center dialog property;
- means for receiving from the contact a contact dialog segment;
- determining whether the contact dialog segment includes a request for help associated with interpreting the first call center dialog segment;
- generating a first dialog metric based on the determination;
- means for generating a set of dialog metrics including the first dialog metric from the contact dialog segment;
- means for comparing the set of dialog metrics against a set of dialog metric thresholds;
- means for replacing the current call center dialog property with a new call center dialog property, if the generated dialog metrics vary from the set of thresholds by a predetermined amount; and
- means for presenting a second call center dialog segment having the new call center dialog property to the contact.

* * * * *

UNITED STATES PATENT AND TRADEMARK OFFICE
CERTIFICATE OF CORRECTION

| | | |
|---|---|---|
| PATENT NO. | : 7,885,391 B2 | |
| APPLICATION NO. | : 10/699264 | |
| DATED | : February 8, 2011 | |
| INVENTOR(S) | : Sherif Yacoub | |

It is certified that error appears in the above-identified patent and that said Letters Patent is hereby corrected as shown below:

In column 7, line 61, in Claim 6, delete "new center" and insert -- new call center --, therefor.

In column 8, line 9, in Claim 9, delete "timescale" and insert -- time-scale --, therefor.

Signed and Sealed this
Twenty-seventh Day of December, 2011

David J. Kappos
*Director of the United States Patent and Trademark Office*